United States Patent
Wilber

(10) Patent No.: US 10,074,282 B1
(45) Date of Patent: Sep. 11, 2018

(54) DISPLAY OF FLIGHT INTERVAL MANAGEMENT DATA

(71) Applicant: THE BOEING COMPANY, Chicago, IL (US)

(72) Inventor: George Wilber, Bellevue, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 15/664,739

(22) Filed: Jul. 31, 2017

(51) Int. Cl.
| | |
|---|---|
| B64D 43/00 | (2006.01) |
| G01C 23/00 | (2006.01) |
| G08G 5/00 | (2006.01) |
| G08G 5/02 | (2006.01) |

(52) U.S. Cl.
CPC ........... *G08G 5/0021* (2013.01); *B64D 43/00* (2013.01); *G08G 5/025* (2013.01)

(58) Field of Classification Search
CPC .................................................. B08G 5/0021
See application file for complete search history.

(56) References Cited

U.S. PATENT DOCUMENTS

| | | | | |
|---|---|---|---|---|
| 2015/0269846 A1* | 9/2015 | De Prins | .............. | G08G 5/0043 701/120 |
| 2016/0171895 A1* | 6/2016 | Scharl | .................. | G08B 5/0021 701/4 |
| 2017/0178519 A1* | 6/2017 | Farjon | .................. | G08G 5/0069 |

OTHER PUBLICATIONS

Penhallegon et al., "Flight Deck-Based Interval Management-Spacing During Departures: Flight Crew Human-In-The-Loop Simulation", Ninth USA/Europe Air Traffic Management Research and Development Seminar (ATM2011), The Mitre Corproation, 12 pages, 2011.

Hicok et al., "Concept of Operations for Interval Management Arrivals and Approach", American Institute of Aeronautics and Astronautics, 12 pages, 2016.

Swieringa et al., "System Performance of an Integrated Airborne Spacing Algorithm with Ground Automation", American Institute of Aeronautics and Astronautics, 22 pages, 2016.

* cited by examiner

*Primary Examiner* — Joseph Feild
*Assistant Examiner* — Pameshanand Mahase
(74) *Attorney, Agent, or Firm* — Womble Bond Dickinson (US) LLP

(57) ABSTRACT

A system for providing flight interval management (FIM) instructions to a pilot of an aircraft includes a module coupled to a display device and configured to communicate with a FIM avionics device. The module generates a first output when input data from the FIM avionics device indicates that the aircraft is within 30 nautical miles of another aircraft, and a second input when a lack of valid input data indicates that the module has lost connectivity to the FIM avionics device. The first input is to the display device to present at least an indication of a paired mode of the module with the FIM avionics device, and a commanded speed reported by the FIM avionics device. The second output is to remove any information presented by the display device and present a blank screen, and then present a status message indicating the lost connectivity to the FIM avionics device.

21 Claims, 10 Drawing Sheets

US 10,074,282 B1

DISPLAY OF FLIGHT INTERVAL MANAGEMENT DATA

FEDERALLY-SPONSORED RESEARCH OR DEVELOPMENT

The invention described herein was made in the performance of work under NASA Contract No. NNL13AA03B-NNL15AB46T and is subject to the provisions of Section 305 of the National Aeronautics and Space Act of 1958 (72 Stat.435: 42 U.S.C. 2457.).

TECHNOLOGICAL FIELD

The present disclosure relates generally to flight interval management in which the spacing between aircraft in flight is managed and, in particular, to the display of flight interval management data to guide aircraft during flight interval management operation of the aircraft.

BACKGROUND

Interval management refers to management of the spacing between aircraft in flight. Interval management may be used to organize and expedite the flow of air traffic in an effective, efficient, and reliable manner. For example, without limitation, interval management may be used to manage the spacing between aircraft approaching an airport runway for landing. A desired spacing between aircraft landing on the runway may be established to improve or optimize the efficiency of landing operations at the airport.

Interval management of aircraft in flight may be implemented by an air traffic control (ATC) system or other appropriate entity. For example, an ATC system or other entity responsible for interval management in an area of aircraft operations may provide information for implementing interval management in the area to aircraft in flight in the area. Such interval management information may indicate, for example, a desired spacing between aircraft operating in the area. The aircraft operating in the area may be required or expected to achieve the indicated spacing between aircraft for interval management.

BRIEF SUMMARY

Example implementations of the present disclosure are directed to a system, method and computer-readable storage medium for providing flight interval management (FIM) instructions to a pilot of an aircraft. Example implementations provide a layout of information during FIM operation that is a very simple design with simple data flows and minimum logic processing. The layout may include information in a number of areas, any one or more of which may be blank. In some applications, however, a fully blank screen may be undesirable (appears same as if powered off). In these applications, the minimum normal display may contain at the very least labels for some indicators of information. And when an error causes non-normal operation, any information on the screen may be pulled and replaced with an appropriate message, alone or with a sub-message below that provides a reason for the error that may be used to debug the error.

The present disclosure thus includes, without limitation, the following example implementations.

Some example implementations provide a system for providing flight interval management (FIM) instructions to a pilot of an aircraft, the system comprising a display device positioned or positionable onboard the aircraft within a primary field of view in a cockpit of the aircraft; and a module coupled to the display device and configured to communicate with a FIM avionics device, the module including a processor and a memory storing executable instructions that, in response to execution by the processor, cause the module to at least: monitor for input data from the FIM avionics device during FIM operation of the aircraft; generate a first output when the input data indicates that the aircraft is within 30 nautical miles of another aircraft, the first output being to the display device to present a layout of information including at least an indication of a paired mode of the module with the FIM avionics device, and a commanded speed reported by the FIM avionics device to guide the aircraft with respect to the other aircraft; and generate a second output when a lack of input data that is valid indicates that the module has lost connectivity to the FIM avionics device, the second output being to the display device to remove any information presented by the display device and present a blank screen, and then present a status message indicating the lost connectivity to the FIM avionics device.

In some example implementations of the system of the preceding or any subsequent example implementation, or any combination thereof, the layout of information further includes a fast-slow speed indicator that indicates a speed of the aircraft relative to the commanded speed, and a progress indicator that indicates progress of the aircraft relative to an assigned spacing goal for the aircraft and the other aircraft.

In some example implementations of the system of any preceding or any subsequent example implementation, or any combination thereof, the fast-slow speed indicator is a first chart that includes a first bar with a first fixed tick mark centered thereon that represents the commanded speed, and that includes a first pointer that is moveable along the first bar and represents the speed of the aircraft relative to the commanded speed, and wherein the progress indicator is a second chart that includes a second bar with a second fixed tick mark centered thereon that represents the assigned spacing goal, and that includes a second pointer that is moveable along the second bar and represents progress of the aircraft relative to the assigned spacing goal.

In some example implementations of the system of any preceding or any subsequent example implementation, or any combination thereof, the first chart and the second chart further include labels for respectively the speed and progress indicated thereby, and wherein the memory stores executable instructions that, in response to execution by the processor and outside FIM operation of the aircraft, cause the module to generate an output to the display device to present the layout of information including only the labels.

In some example implementations of the system of any preceding or any subsequent example implementation, or any combination thereof, the memory stores executable instructions that, in response to execution by the processor, cause the module to further generate another first output when the input data indicates that the aircraft is outside 30 nautical miles from the other aircraft, the third output being to the display device to present the layout of information further including the fast-slow speed indicator, but excluding the progress indicator.

In some example implementations of the system of any preceding or any subsequent example implementation, or any combination thereof, a condition of the lack of input data that is valid indicates one of a plurality of causes for the lost connectivity, and the module being caused to generate the second output includes being caused to generate the second output to the display device to present the status message further indicating the one of the plurality of causes for the lost connectivity.

In some example implementations of the system of any preceding or any subsequent example implementation, or any combination thereof, the executable instructions include executable instructions that, in response to execution by the processor, cause the module to implement at least an I/O server configured to monitor for input data from the FIM avionics device, and a display server configured to generate the first output and the second output, and wherein the display device includes a second processor and a second memory storing executable instructions that, in response to execution by the second processor, cause the display device to implement a display client configured to receive the first output and the second output from the display server and cause the display device to respectively present the layout of information, and remove any information presented by the display device and then present the status message.

Some example implementations provide a method of providing flight interval management (FIM) instructions to a pilot of an aircraft including a display device positioned onboard the aircraft within a primary field of view in a cockpit of the aircraft, the method comprising monitoring for input data from a FIM avionics device during FIM operation of the aircraft; generating a first output when the input data indicates that the aircraft is within 30 nautical miles of another aircraft, the first output being to the display device to present a layout of information including at least an indication of a paired mode of the module with the FIM avionics device, and a commanded speed reported by the FIM avionics device to guide the aircraft with respect to the other aircraft; and generating a second output when a lack of input data that is valid indicates that the module has lost connectivity to the FIM avionics device, the second output being to the display device to remove any information presented by the display device and present a blank screen, and then present a status message indicating the lost connectivity to the FIM avionics device.

In some example implementations of the method of any preceding or any subsequent example implementation, or any combination thereof, the layout of information further includes a fast-slow speed indicator that indicates a speed of the aircraft relative to the commanded speed, and a progress indicator that indicates progress of the aircraft relative to an assigned spacing goal for the aircraft and the other aircraft.

In some example implementations of the method of any preceding or any subsequent example implementation, or any combination thereof, the fast-slow speed indicator is a first chart that includes a first bar with a first fixed tick mark centered thereon that represents the commanded speed, and that includes a first pointer that is moveable along the first bar and represents the speed of the aircraft relative to the commanded speed, and wherein the progress indicator is a second chart that includes a second bar with a second fixed tick mark centered thereon that represents the assigned spacing goal, and that includes a second pointer that is moveable along the second bar and represents progress of the aircraft relative to the assigned spacing goal.

In some example implementations of the method of any preceding or any subsequent example implementation, or any combination thereof, the first chart and the second chart further include labels for respectively the speed and progress indicated thereby, and wherein the method further includes, outside FIM operation of the aircraft, generating an output to the display device to present the layout of information including only the labels.

In some example implementations of the method of any preceding or any subsequent example implementation, or any combination thereof, the method further comprises generating another first output when the input data indicates that the aircraft is outside 30 nautical miles from the other aircraft, the third output being to the display device to present the layout of information further including the fast-slow speed indicator, but excluding the progress indicator.

In some example implementations of the method of any preceding or any subsequent example implementation, or any combination thereof, a condition of the lack of input data that is valid indicates one of a plurality of causes for the lost connectivity, and generating the second output includes generating the second output to the display device to present the status message further indicating the one of the plurality of causes for the lost connectivity.

In some example implementations of the method of any preceding or any subsequent example implementation, or any combination thereof, the method is implemented by a module implementing at least an I/O server to monitor for input data from the FIM avionics device, and a display server to generate the first output and the second output, and wherein the display device implements a display client to receive the first output and the second output from the display server and cause the display device to respectively present the layout of information, and remove any information presented by the display device and then present the status message.

Some example implementations provide a computer-readable storage medium for providing flight interval management (FIM) instructions to a pilot of an aircraft including a display device positioned onboard the aircraft within a primary field of view in a cockpit of the aircraft, the computer-readable storage medium being non-transitory and having computer-readable program code portions stored therein that in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

FIG. 1 schematically illustrates a system for providing flight interval management (FIM) instructions to a pilot of an aircraft, in accordance with some example implementations of the present disclosure;

DETAILED DESCRIPTION

Figure 1:
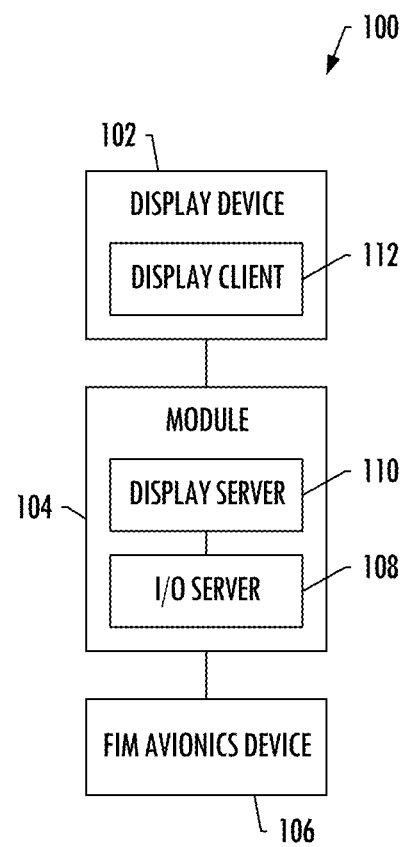

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like. Unless otherwise stated, any one or more, if not all, of these may be absolute or approximate to account for acceptable variations that may occur, such as those due to engineering tolerances or the like. Like reference numerals refer to like elements throughout.

As explained above, interval management—or flight interval management (FIM)—refers to management of the spacing between aircraft in flight. In some implementations, FIM is enabled by Automatic Dependent Surveillance-Broadcast (ADS-B) technology along with other technologies. ADS-B enhances safety by enabling display of traffic positions and other data, in real-time, to air traffic control (ATC) and to other appropriately equipped ADS-B aircraft with position and velocity data transmitted every second. The ADS-B system relies on two avionics components—a high-integrity GPS navigation source and a data link (ADS-B unit) connected to other aircraft systems. ADS-B enables a pilot to display traffic information for surrounding aircraft, including the identification, position, altitude, heading and groundspeed of those aircraft.

Generally, FIM operation includes the instruction to an aircraft pilot to achieve or maintain a desired spacing (in time or distance) from to another, target aircraft. In a number of implementations, an FIM avionics device onboard the aircraft obtains data from an ATC data link, and the ADS-B system that receives position information from the GPS navigation source and traffic information for the target aircraft from the ADS-B unit. From this information, the FIM avionics device may determine the heading and velocity of the aircraft required to maintain the desired spacing from the target aircraft, such as according to NASA's Airborne Spacing for Terminal Arrival Routes (ASTAR). Appropriate FIM data (including any appropriate FIM instructions) may then be presented on a display device to guide the pilot to achieve or maintain the desired spacing during FIM operation.

Example implementations of the present disclosure are directed to the display of FIM data to guide aircraft during FIM operation of the aircraft. FIG. 1 schematically illustrates a system 100 for providing flight interval management (FIM) instructions to a pilot of an aircraft, in accordance with some example implementations of the present disclosure. As shown, in some examples, the system includes a display device 102 and a module 104 coupled to the display device and configured to communicate with a FIM avionics device 106. The display device is positioned or positionable onboard the aircraft within a primary field of view in a cockpit of the aircraft.

The module 104 is configured to monitor for input data from the FIM avionics device 106 during FIM operation of the aircraft, and generate outputs to the display device 102 based on the input data or lack thereof. For example, the module is configured to generate a first output to the display device when the input data indicates that the aircraft is within 30 nautical miles of another aircraft. And the module is configured to generate a second output when a lack of input data that is valid indicates that the module has lost connectivity to the FIM avionics device.

In some examples, the module 104 is configured to implement at least an I/O server 108 configured to monitor for input data from the FIM avionics device 106, and a display server 110 configured to generate the first output and the second output. In these examples, the display device 102 is configured to implement a display client 112 configured to receive the first output and the second output from the display server and cause the display device to respectively present the layout of information, and remove any information presented by the display device and then present the status message.

In some even more particular examples, the module 104 is implemented by an electronic flight bag (EFB) configured to host the I/O server 108 and display server 110. In some examples, the EFB may also be configured to implement the FIM avionics device 106. In these examples, the EFB includes a wired or wireless interface to one or more of the display device 102 each of which is configured to implement a respective display client 112. In some examples, the display device is configured to run a HTTP (hypertext transfer protocol) browser that is in turn configured to host the display client (HTTP client). The display device may be within a primary field of view (PFOV) of the captain in the cockpit of the aircraft, and in some examples, another display device may be within the PFOV of the first officer. Or in other examples, the module is implemented by the captain EFB; and another of the module is implemented by the first officer EFB, and the first office EFB has a wired or wireless interface to the display device within the PFOV of the first officer.

In some examples, the logic processing is performed by the module 104, and more particularly the display server 110 of the module, leaving only display commands and drawing constructs to the display device 102. In fact, it may be the case that no resident software is hosted or executed on the display device, with the only operational software executed directly on the display device to carry out its role in the system 100 being a commercially-available HTTP browser to render the layout of information to the pilot. This minimizes the latency, ensures same information is displayed on one or even multiple display devices at the same time, and reduces display drawing complexity, latency and jitter.

According to example implementations of the present disclosure, one of the purposes of the system 100 is to display appropriate FIM information to the pilot or other flight crew in their PFOV. The display device 102 may therefore perform display functions in a manner to ensure only valid information is provided and misleading and hazardous information is not displayed in the PFOV. As described in greater detail below, FIG. 2 illustrates a layout 200 including an arrangement of information that may be presented by the display device in response to outputs generated by the module 104, according to some examples.

In some examples, one of the operational goals for the system 100 is to display aircraft speed guidance and deviation indications in the flight crew's PFOV. The system provides the crew with necessary information to safely conduct airborne IM spacing, such as the following in various examples:

Display IM commanded speeds within the crew's PFOV
Display IM state changes and speed changes in the PFOV
Monitor EFB outputs and alert the crew to keep them fully aware of changes
Display information consistent with the EFB IM pages
Auto-populate information when received from the EFB with no perceivable EFB-CGD latency
Display data consistent with the EFB data and formats To achieve the foregoing, the layout 200 of some example implementations is a very simple design with simple data flows and minimum logic processing by the system 100. The FIM avionics device 106 may command values and display graphics in a number of areas, any one or more of which may be blank. In some applications, however, a fully blank screen may be undesirable (appears same as if powered off). In these applications, the minimum normal display may contain at the very least labels for some indicators of information. When an error causes non-normal operation, any information on the screen may be pulled and replaced with an appropriate message, alone or with a sub-message below that provides a reason for the error that may be used to debug the error.

Figure 2:
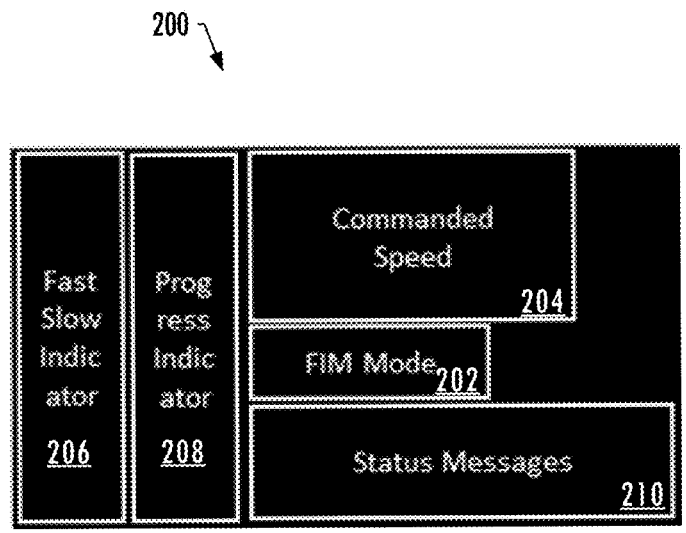
FIG. 2 illustrates a layout including an arrangement of information that may be presented by the system of FIG. 1, according to some example implementations.

Turning now more specifically to FIG. 2, information in the layout 200 presented by the display device 102 may include—and occupy display areas of the same name—an input/output (I/O) mode 202 of the FIM avionics device 106, and a commanded speed 204 reported by the FIM avionics device 106 to guide the aircraft with respect to the other aircraft. The information may include a fast-slow speed indicator 206 that indicates a speed of the aircraft relative to the commanded speed, and/or a progress indicator 208 that indicates progress of the aircraft relative to an assigned spacing goal for the aircraft and the other aircraft. The information may also include one or more status messages 110.

The I/O mode 202 is to the right of the fast-slow speed indicator 206 and below the commanded speed 204 using the middle third of the vertical pixels. The commanded speed is to the right of the fast-slow speed indicator and encompasses top third of the vertical pixels. The fast-slow speed indicator is on the left of the layout 200 and encompasses all vertical pixels. The progress indicator 208 is just to the right of the fast-slow speed indicator and encompasses all vertical pixels. The status messages 110 are to the right of the fast-slow speed indicator and below the I/O mode using the bottom third of the vertical pixels.

Figure 3:
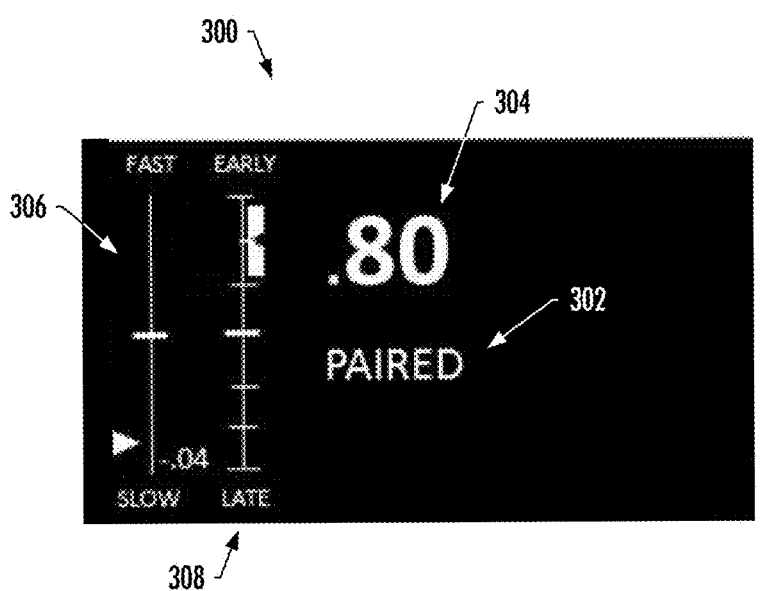
FIGS. 3, 4, 5, 6A and 6B illustrate various layouts according to example implementations.

FIGS. 3, 4, 5, 6A and 6B illustrate various example layouts according to some example implementations. As introduced above, the outputs generated by the module 104 include a first output when the input data indicates that the aircraft is within 30 nautical miles of another aircraft. As shown in FIG. 3, in some examples, the first output is to the display device 102 to present a layout 300 of information including at least an indication of a paired mode 302 (FIM mode 202) of the module with the FIM avionics device, and a commanded speed 304 (commanded speed 204) reported by the FIM avionics device to guide the aircraft with respect to the other aircraft. As also shown, in some examples, the layout of information further includes a fast-slow speed indicator 306 (fast-slow speed indicator 206) that indicates a speed of the aircraft relative to the commanded speed, and a progress indicator 308 (progress indicator 208) that indicates progress of the aircraft relative to an assigned spacing goal for the aircraft and the other aircraft.

In some further examples, the fast-slow speed indicator 306 is a first chart that includes a first bar with a first fixed tick mark centered thereon that represents the commanded speed, and that includes a first pointer that is moveable along the first bar and represents the speed of the aircraft relative to the commanded speed. Similarly, in some examples, the progress indicator 308 is a second chart that includes a second bar with a second fixed tick mark centered thereon that represents the assigned spacing goal, and that includes a second pointer that is moveable along the second bar and represents progress of the aircraft relative to the assigned spacing goal.

Figure 4:
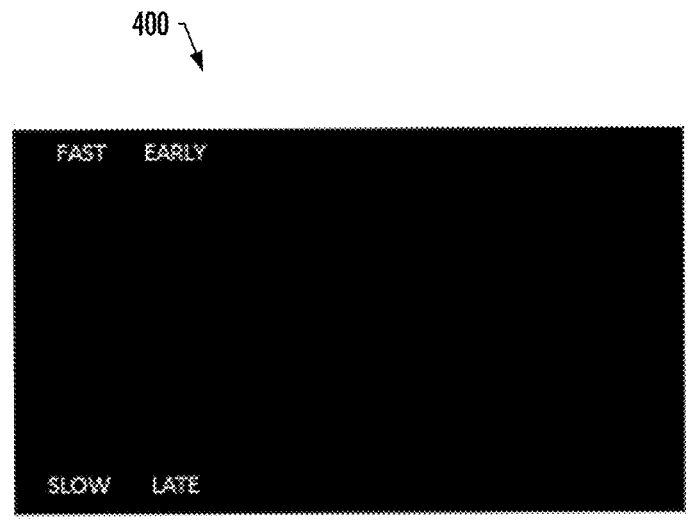

In some even further examples, the first chart of the fast-slow speed indicator 306 and the second chart of the progress indicator 308 further include labels for respectively the speed and progress indicated thereby. In these further examples, outside FIM operation of the aircraft, the module 104 is configured to generate an output to the display device to present the layout 400 of information including only the labels, as shown in FIG. 4. This may be useful in applications to indicate normal operation when not performing FIM operations but when the system 100 is up and running normally. These labels may be displayed to ensure a blank CGD screen is not a normal operational display, which is what will appear if the display device 102 loses power. In some examples, it is possible for a FIM status message "IM SYS FAIL" to be displayed during non-procedural operations.

Figure 5:
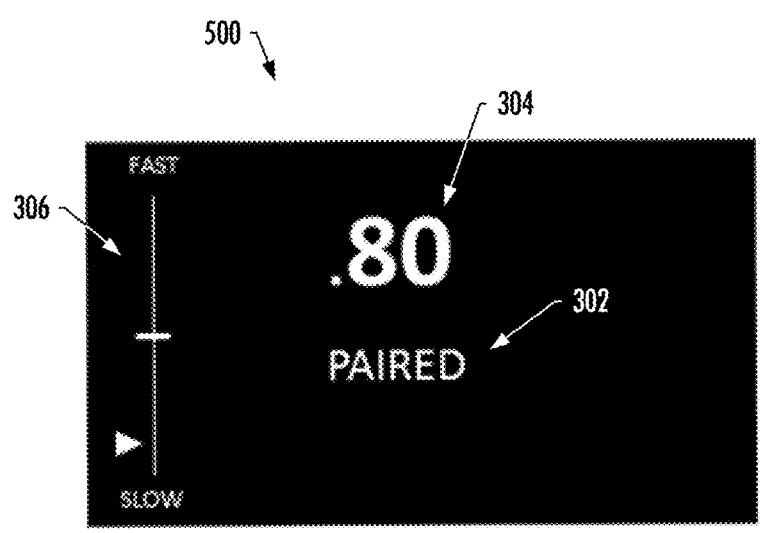

During normal FIM operations outside 30 nautical miles from the other aircraft, a display such as that shown in FIG. 5 may be presented in which no progress indicator 308 displayed. More particularly, in some examples, the module 104 is configured to further generate another first output when the input data indicates that the aircraft is outside 30 nautical miles from the other aircraft. In these examples, the third output is to the display device 102 to present the layout of information 500 further including the fast-slow speed indicator 306, but excluding the progress indicator.

Some applications may have a requirement that that the information displayed to the flight crew must be timely and not provide hazardous information. To accomplish this with one-way communications, watchdog timers may be implemented in the display device 102 and/or module 104. The module may set a watchdog timer and monitor its connection to the FIM avionics device 106, and send an appropriate message to the display device when it discovers non-normal (too long between input data or lost connection) operation and data flow. Similarly, the display device may set a watchdog timer and monitor its connection to the module for non-normal operation (too long between outputs or lost connection). The system may therefore handle timeliness of the data within its domain and ensure the flight crew is alerted if normal operations are not functioning properly. That is, when data is not being received at the prescribed rate, when current data becomes stale, or when connectivity is lost.

Figure 6A:
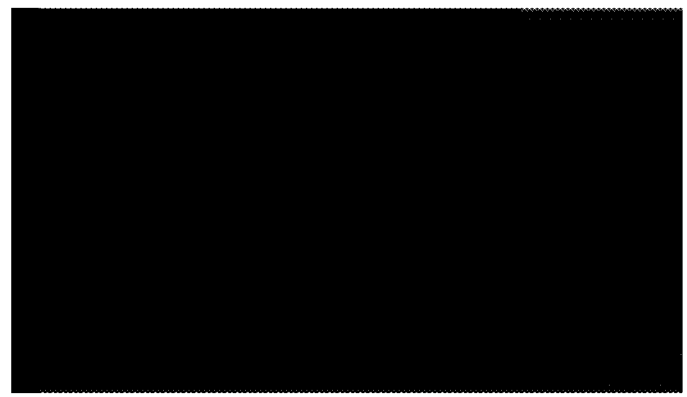
Figure 6B:

Further to the above and as also earlier introduced, the outputs generated by the module 104 include a second output when a lack of input data that is valid indicates that the module has lost connectivity to the FIM avionics device 106. As shown in FIGS. 6A and 6B, in some examples, the second output is to the display device 102 to remove any information presented by the display device and present a blank screen 400a, and then present a layout 600b including a status message 602 (status message 110) indicating the lost connectivity to the FIM avionics device. In some examples, a condition of the lack of input data that is valid indicates one of a plurality of causes for the lost connectivity. In these examples, the status message further indicates 604 the one of the plurality of causes for the lost connectivity.

More specifically, in some examples, non-normal operations that result in loss of connectivity provide a single message to the flight crew (on all active display devices 102) stating "CONNECTION LOST" and an error reason. The following are some reasons that may cause this condition. The module 104 may have not acquired an initial connection to the FIM avionics device 106 ("NO INITIAL FIM CONNECTION"), or may have lost its connection to the FIM avionics device (e.g., "LOST FIM CONNECTION"). The module may have gone too long without good or otherwise valid data from a connected FIM avionics device (e.g., "FIM IO TIMEOUT"). The display device 102 may have lost its connection to the module, or more particularly the display server 110 (e.g., "LOST SERVER CONNECTION"), or the display device may have gone too long without good or otherwise valid data from a connected display server (e.g., "SERVER TIMEOUT").

Figure 7:
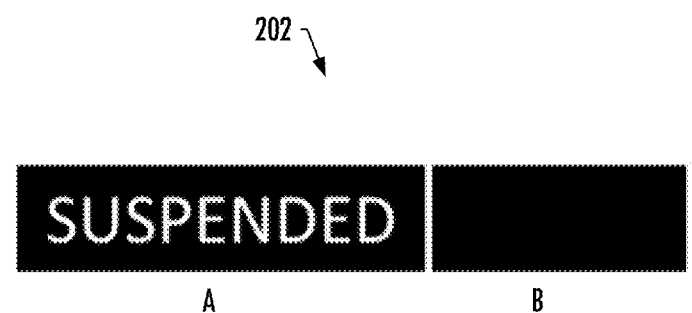
FIGS. 7-13 illustrate various areas of information in the layout of FIG. 2, according to some example implementations.

Briefly returning to FIG. 2, the information in the layout 200 of some example implementations will now be described more particularly with reference to FIGS. 7-13. FIG. 7 illustrates the I/O mode 202 from the layout of FIG. 2, according to some example implementations. The display area including the I/O mode contains a single line of text (A), possibly an empty string (B). The I/O mode may be drawn in white. While any text may be displayed the display is designed for following text values: UNABLE, AVAILABLE, ARMED, SUSPENDED (shown), and PAIRED (see FIGS. 3, 5).

Figure 8:
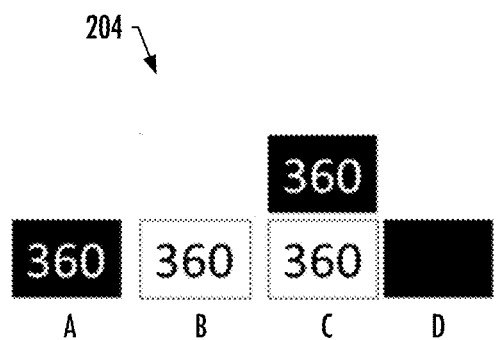

FIG. 8 illustrates the commanded speed 204 from the layout 200 of FIG. 2, according to some example implementations. As shown in FIG. 2, The display area including the commanded speed contains a single line of text (A, B, C), possibly an empty string (D). The commanded speed may be drawn in white for normal display on a black background or in black on a white background (reverse video). It may blink by alternating between white-on-black and black-on-white at a one hertz rate to get flight crew attention. The following display modes are allowed and depicted in FIG. 8: normal white (A), attention—reverse video (B), non-conformance—alternating normal and reverse video (C), and off or no value (D).

Figure 9:
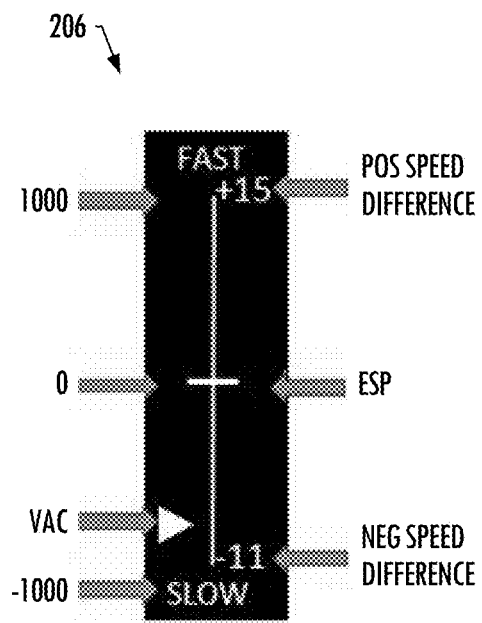
Figure 10:
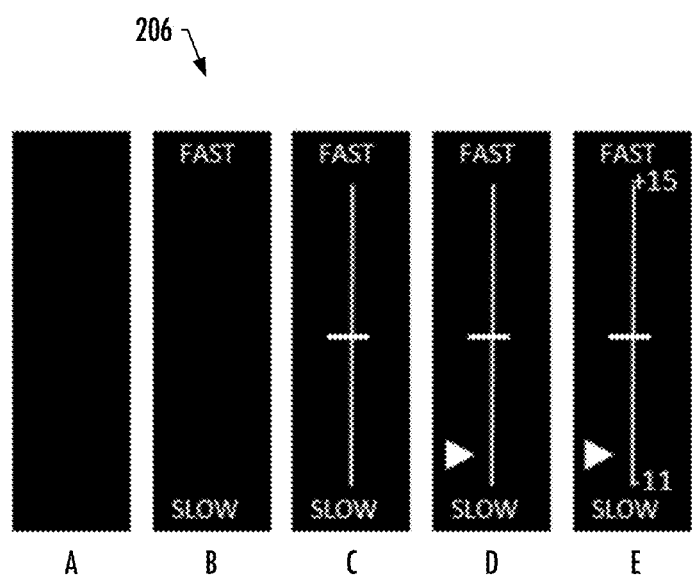

FIGS. 9 and 10 illustrate the fast-slow speed indicator 206 from the layout 200 of FIG. 2, according to some example implementations. The display area including the fast-slow speed indicator contains top and bottom labels and a vertical bar and tick mark representing the FIM commanded estimated speed (ESP). The aircraft velocity (VAC) is displayed as a white triangle along the left side of the vertical bar. Positive and negative speed deltas may also be shown (operationally one at a time), as shown in FIG. 9. The different display views for the display modes are depicted in FIG. 10, and include the following: off (A), labels only (B), enabled—no data (C), enable with VAC (D), and enable with VAC and speed differentials (E).

Figure 11:
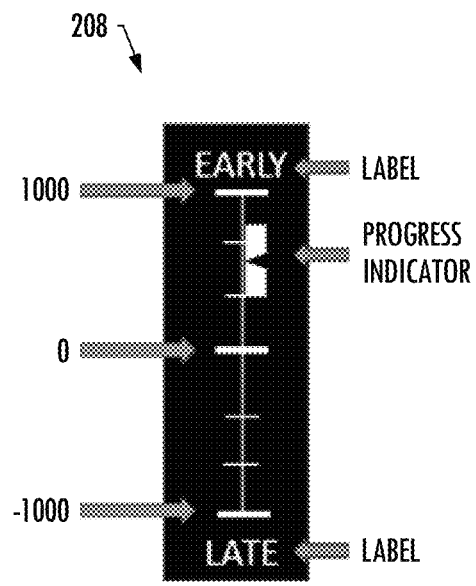
Figure 12:
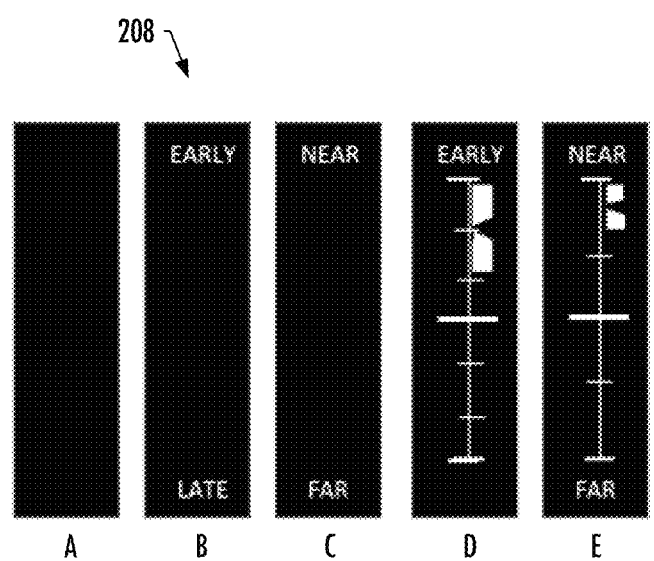

FIGS. 11 and 12 illustrate the progress indicator 208 from the layout 200 of FIG. 2, according to some example implementations. The display area including the progress indicator contains top and bottom labels and a vertical bar and tick marks. The progress indicator is displayed as a white caliper along the right side of the vertical bar. Caliper size depends on the scale which may be large or small, as shown in FIG. 11. The progress indicator has modes for time-based operations (with EARLY-LATE labels) and distance-based operations (with NEAR-FAR labels). The progress indicator supports two scales, with difference size calipers and different tick marks. The different display views for the display modes of the progress indicator are depicted in FIG. 12, and include the following: off (A), time-based labels only (B), distance-based labels only (C), time-based enabled with caliper (shown with large caliper) (D), and distance-based enabled with caliper (shown with small caliper) (E).

Figure 13:
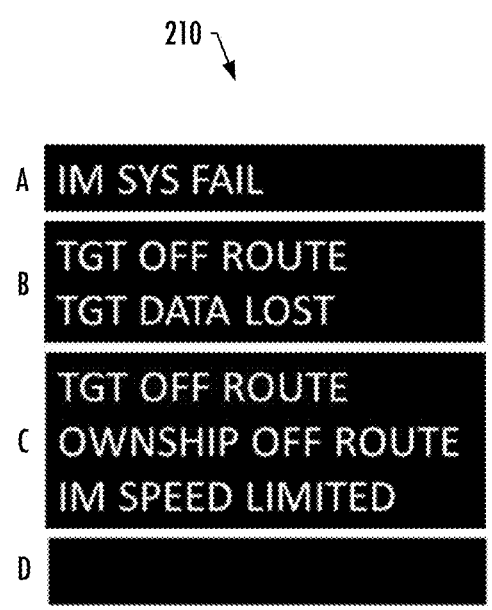

FIG. 13 illustrates the status messages 210 from the layout 200 of FIG. 2, according to some example implementations. The display area including the status messages contains up to three lines of text (A, B, C), possibly only a single empty string (D). The status messages are drawn in white. While any text may be displayed, the display is designed for a set of text values, the longest message being "OWNSHIP OFF ROUTE." The following are some expected status messages: TGT OFF ROUTE, OWNSHIP OFF ROUTE, IM SPEED LIMITED, IM SYS FAIL, and TGT DATA LOST. Some of the above are depicted in FIG. 13, showing one (A), two (B), three (C), or even zero (D), simultaneous messages.

Figure 14:
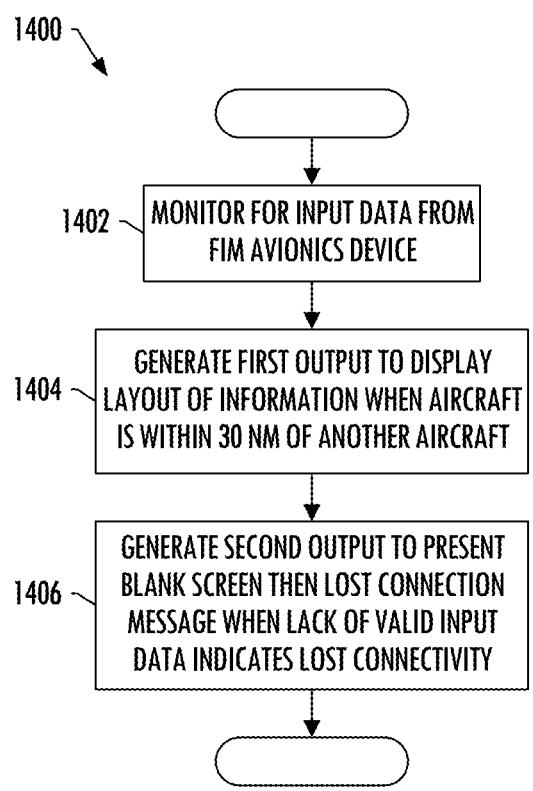
FIG. 14 illustrates a flowchart including various operations of a method of suppressing background clutter with respect to a foreground target in video imagery, according to some example implementations.

FIG. 14 illustrates a flowchart including various operations of a method 1400 of providing FIM instructions to a pilot of an aircraft including a display device positioned onboard the aircraft within a primary field of view in a cockpit of the aircraft, according to some example implementations of the present disclosure. As shown at block 1402, the method includes monitoring for input data from a FIM avionics device during FIM operation of the aircraft. The method includes generating a first output when the input data indicates that the aircraft is within 30 nautical miles of another aircraft, and generating a second output when a lack of input data that is valid indicates that the module has lost connectivity to the FIM avionics device, as shown at respectively blocks 1404 and 1406. The first output is to the display device to present a layout of information including at least an indication of a paired mode of the module with the FIM avionics device, and a commanded speed reported by the FIM avionics device to guide the aircraft with respect to the other aircraft. The second output is to the display device to remove any information presented by the display device and present a blank screen, and then present a status message indicating the lost connectivity to the FIM avionics device.

In some examples, one or more apparatuses may be provided that are configured to function as or otherwise implement the system 100 including its display device 102 and module 104. In examples involving more than one apparatus, the respective apparatuses may be connected to or otherwise in communication with one another in a number of different manners, such as directly or indirectly via a wired or wireless network or the like.

Figure 15:
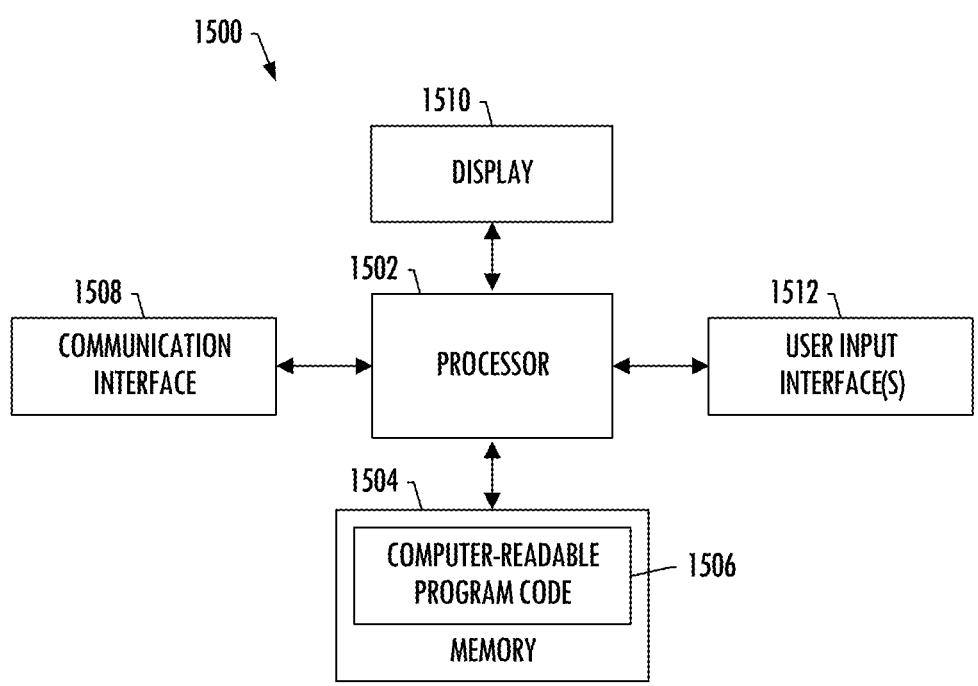
FIG. 15 illustrates an apparatus that may correspond to the computing apparatus according to some example implementations.

FIG. 15 more particularly illustrates an apparatus 1500 that in some examples may be configured to implement the display device 102 and/or module 104. Generally, an apparatus of example implementations of the present disclosure may comprise, include or be embodied in one or more fixed or portable electronic devices. As described above, one example of a suitable electronic device that may be configured to implement the module is an EFB. Examples of suitable electronic devices that may be configured to implement either or both the display device or module include a smartphone, tablet computer, laptop computer, desktop computer, workstation computer, server computer or the like. The apparatus may include one or more of each of a number of components such as, for example, a processor 1502 connected to a memory 1504 (e.g., storage device).

The processor 1502 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 1504 (of the same or another apparatus).

The processor 1502 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field programmable gate arrays (FPGAs) or the like. Thus, although the processor may be capable of executing a computer program to perform one or more functions, the processor of various examples may be capable of performing one or more functions without the aid of a computer program.

The memory 1504 is generally any piece of computer hardware that is capable of storing information such as, for example, data, computer programs (e.g., computer-readable program code 1506) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communication interface 1508 (e.g., communications unit) and/or one or more user interfaces. The communication interface may be configured to transmit and/or receive information, such as to and/or from other apparatus(es), network(s) or the like. The communication interface may be configured to transmit and/or receive information by physical (wired) and/or wireless communications links. Examples of suitable communication interfaces include a network interface controller (NIC), wireless NIC (WNIC) or the like.

The user interfaces may include a display 1510 and/or one or more user input interfaces 1512 (e.g., input/output unit). The display may be configured to present or otherwise display information to a user, suitable examples of which include a liquid crystal display (LCD), light-emitting diode display (LED), plasma display panel (PDP) or the like.

The user input interfaces 1512 may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 1500 may include a processor 1502 and a computer-readable storage medium or memory 1504 coupled to the processor, where the processor is configured to execute computer-readable program code 1506 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for providing flight interval management (FIM) instructions to a pilot of an aircraft, the system comprising:
   a display device positioned or positionable onboard the aircraft within a primary field of view in a cockpit of the aircraft; and
   a module coupled to the display device and configured to communicate with a FIM avionics device, the module including a processor and a memory storing executable instructions that, in response to execution by the processor, cause the module to at least:
      monitor for input data from the FIM avionics device during FIM operation of the aircraft;
      generate a first output when the input data indicates that the aircraft is within 30 nautical miles of another aircraft, the first output being to the display device to present a layout of information including at least an indication of a paired mode of the module with the FIM avionics device, and a commanded speed reported by the FIM avionics device to guide the aircraft with respect to the other aircraft; and
      generate a second output when a lack of input data that is valid indicates that the module has lost connectivity to the FIM avionics device, the second output being to the display device to remove any information presented by the display device and present a blank screen, and then present a status message indicating the lost connectivity to the FIM avionics device.

2. The system of claim 1, wherein the layout of information further includes a fast-slow speed indicator that indicates a speed of the aircraft relative to the commanded speed, and a progress indicator that indicates progress of the aircraft relative to an assigned spacing goal for the aircraft and the other aircraft.

3. The system of claim 2, wherein the fast-slow speed indicator is a first chart that includes a first bar with a first fixed tick mark centered thereon that represents the commanded speed, and that includes a first pointer that is moveable along the first bar and represents the speed of the aircraft relative to the commanded speed, and
   wherein the progress indicator is a second chart that includes a second bar with a second fixed tick mark centered thereon that represents the assigned spacing goal, and that includes a second pointer that is moveable along the second bar and represents progress of the aircraft relative to the assigned spacing goal.

4. The system of claim 3, wherein the first chart and the second chart further include labels for respectively the speed and progress indicated thereby, and
   wherein the memory stores executable instructions that, in response to execution by the processor and outside FIM operation of the aircraft, cause the module to generate an output to the display device to present the layout of information including only the labels.

5. The system of claim 2, wherein the memory stores executable instructions that, in response to execution by the processor, cause the module to further generate another first output when the input data indicates that the aircraft is outside 30 nautical miles from the other aircraft, the third output being to the display device to present the layout of information further including the fast-slow speed indicator, but excluding the progress indicator.

6. The system of claim 1, wherein a condition of the lack of input data that is valid indicates one of a plurality of causes for the lost connectivity, and the module being caused to generate the second output includes being caused to generate the second output to the display device to present the status message further indicating the one of the plurality of causes for the lost connectivity.

7. The system of claim 1, wherein the executable instructions include executable instructions that, in response to execution by the processor, cause the module to implement at least an I/O server configured to monitor for input data from the FIM avionics device, and a display server configured to generate the first output and the second output, and
   wherein the display device includes a second processor and a second memory storing executable instructions that, in response to execution by the second processor, cause the display device to implement a display client configured to receive the first output and the second output from the display server and cause the display device to respectively present the layout of information, and remove any information presented by the display device and then present the status message.

8. A method of providing flight interval management (FIM) instructions to a pilot of an aircraft including a display device positioned onboard the aircraft within a primary field of view in a cockpit of the aircraft, the method comprising:
   monitoring for input data from a FIM avionics device during FIM operation of the aircraft;
   generating a first output when the input data indicates that the aircraft is within 30 nautical miles of another aircraft, the first output being to the display device to present a layout of information including at least an indication of a paired mode of the module with the FIM avionics device, and a commanded speed reported by the FIM avionics device to guide the aircraft with respect to the other aircraft; and generating a second output when a lack of input data that is valid indicates that the module has lost connectivity to the FIM avionics device, the second output being to the display device to remove any information presented by the display device and present a blank screen, and then present a status message indicating the lost connectivity to the FIM avionics device.

9. The method of claim 8, wherein the layout of information further includes a fast-slow speed indicator that indicates a speed of the aircraft relative to the commanded speed, and a progress indicator that indicates progress of the aircraft relative to an assigned spacing goal for the aircraft and the other aircraft.

10. The method of claim 9, wherein the fast-slow speed indicator is a first chart that includes a first bar with a first fixed tick mark centered thereon that represents the commanded speed, and that includes a first pointer that is moveable along the first bar and represents the speed of the aircraft relative to the commanded speed, and wherein the progress indicator is a second chart that includes a second bar with a second fixed tick mark centered thereon that represents the assigned spacing goal, and that includes a second pointer that is moveable along the second bar and represents progress of the aircraft relative to the assigned spacing goal.

11. The method of claim 10, wherein the first chart and the second chart further include labels for respectively the speed and progress indicated thereby, and wherein the method further includes, outside FIM operation of the aircraft, generating an output to the display device to present the layout of information including only the labels.

12. The method of claim 9 further comprising generating another first output when the input data indicates that the aircraft is outside 30 nautical miles from the other aircraft, the third output being to the display device to present the layout of information further including the fast-slow speed indicator, but excluding the progress indicator.

13. The method of claim 8, wherein a condition of the lack of input data that is valid indicates one of a plurality of causes for the lost connectivity, and generating the second output includes generating the second output to the display device to present the status message further indicating the one of the plurality of causes for the lost connectivity.

14. The method of claim 8, implemented by a module implementing at least an I/O server to monitor for input data from the FIM avionics device, and a display server to generate the first output and the second output, and wherein the display device implements a display client to receive the first output and the second output from the display server and cause the display device to respectively present the layout of information, and remove any information presented by the display device and then present the status message.

15. A non-transitory computer-readable storage medium for providing flight interval management (FIM) instructions to a pilot of an aircraft including a display device positioned onboard the aircraft within a primary field of view in a cockpit of the aircraft, the non-transitory computer-readable storage medium having computer-readable program code portions stored therein that in response to execution by a processor, cause an apparatus to at least:

monitor for input data from an FIM avionics device during FIM operation of the aircraft;

generate a first output when the input data indicates that the aircraft is within 30 nautical miles of another aircraft, the first output being to the display device to present a layout of information including at least an indication of a paired mode of the module with the FIM avionics device, and a commanded speed reported by the FIM avionics device to guide the aircraft with respect to the other aircraft; and generate a second output when a lack of input data that is valid indicates that the module has lost connectivity to the FIM avionics device, the second output being to the display device to remove any information presented by the display device and present a blank screen, and then present a status message indicating the lost connectivity to the FIM avionics device.

16. The non-transitory computer-readable storage medium of claim 15, wherein the layout of information further includes a fast-slow speed indicator that indicates a speed of the aircraft relative to the commanded speed, and a progress indicator that indicates progress of the aircraft relative to an assigned spacing goal for the aircraft and the other aircraft.

17. The non-transitory computer-readable storage medium of claim 16, wherein the fast-slow speed indicator is a first chart that includes a first bar with a first fixed tick mark centered thereon that represents the commanded speed, and that includes a first pointer that is moveable along the first bar and represents the speed of the aircraft relative to the commanded speed, and wherein the progress indicator is a second chart that includes a second bar with a second fixed tick mark centered thereon that represents the assigned spacing goal, and that includes a second pointer that is moveable along the second bar and represents progress of the aircraft relative to the assigned spacing goal.

18. The non-transitory computer-readable storage medium of claim 17, wherein the first chart and the second chart further include labels for respectively the speed and progress indicated thereby, and wherein the non-transitory computer-readable storage medium has computer-readable program code portions stored therein that in response to execution by the processor, cause the apparatus to generate an output to the display device to present the layout of information including only the labels.

19. The non-transitory computer-readable storage medium of claim 16, wherein the non-transitory computer-readable storage medium has computer-readable program code portions stored therein that in response to execution by the processor, cause the apparatus to further generate another first output when the input data indicates that the aircraft is outside 30 nautical miles from the other aircraft, the third output being to the display device to present the layout of information further including the fast-slow speed indicator, but excluding the progress indicator.

20. The non-transitory computer-readable storage medium of claim 15, wherein a condition of the lack of input data that is valid indicates one of a plurality of causes for the lost connectivity, and the apparatus being caused to generate the second output includes being caused to generate the second output to the display device to present the status message further indicating the one of the plurality of causes for the lost connectivity.

21. The non-transitory computer-readable storage medium of claim 15, wherein the computer-readable program code portions include computer-readable program code portions that, in response to execution by the processor, cause the apparatus to implement at least an I/O server configured to monitor for input data from the FIM avionics device, and a display server configured to generate the first output and the second output, and wherein the display device is configured to implement a display client to receive the first output and the second output from the display server and cause the display device to respectively present the layout of information, and remove any information presented by the display device and then present the status message.

\* \* \* \* \*